United States Patent [19]

Burckhardt

[11] 4,075,892

[45] Feb. 28, 1978

[54] INDICATING ARRANGEMENT FOR A DISTANCE WARNING INSTALLATION

[75] Inventor: Manfred H. Burckhardt, Waiblingen, Germany

[73] Assignee: Daimler-Benz Aktiengesellschaft, Germany

[21] Appl. No.: 668,422

[22] Filed: Mar. 19, 1976

[30] Foreign Application Priority Data

Mar. 20, 1975 Germany .............................. 2512144

[51] Int. Cl.² ...................... B60K 35/00; G01P 15/00
[52] U.S. Cl. ....................................... 73/495; 73/509; 116/56
[58] Field of Search ............... 73/490, 489, 495, 509; 116/37, 56, 57, 116; 340/104, 258 R, 258 A; 235/150.2, 151.32

[56] References Cited

U.S. PATENT DOCUMENTS

| 3,205,707 | 9/1965 | Richter | 73/178 T |
| 3,575,592 | 4/1971 | Carter et al. | 235/150.2 X |
| 3,689,882 | 9/1972 | Dessailly | 340/258 R X |

Primary Examiner—James J. Gill
Attorney, Agent, or Firm—Craig & Antonelli

[57] ABSTRACT

A distance-warning system in motor vehicles which is equipped with measuring and evaluating devices for determining the distance of the vehicle with respect to an obstacle disposed in front thereof and for determining the approach velocity to this obstacle; the brake deceleration which is required for avoiding a collision is obtained by means of a computer from the values determined by the measuring and evaluating devices; the brake deceleration thus determined is then reproduced as a desired value indication on a scale having deceleration values marked thereon.

14 Claims, 3 Drawing Figures

INDICATING ARRANGEMENT FOR A DISTANCE WARNING INSTALLATION

The present invention relates to an indicating arrangement for a distance warning system in motor vehicles which are equipped with measuring and evaluating installations for determining the distance of the vehicle relative to an obstacle disposed in front thereof and for determining the approach velocity with respect to this obstacle.

Distance-warning installations are known in the prior art. The measuring and evaluating devices which are coordinated in the prior art to these warning systems operate thereby generally with radar, infrared or ultrasonics as carrier medium and thereby interpret continuously the obtained measurement results by way of conventional computers whereby the type of the evaluation is different from case to case. The computer results are finally indicated also by conventional known means in suitable form either optically or in other systems also acoustically. In simple cases, warning lamps light up or warning signals are produced. In other cases (German Auslegeschrift No. 2,241,427) only the distance to a preceding vehicle is indicated by way of the measuring and evaluating installations with a pointer on a scale calibrated in meters, on which also the safety distance becomes visible by a movable indicating field, to which is mechanically coordinated the speed scale disposed thereabove.

In all prior art distance warning systems an indication is given when falling below a safety distance, however, there is no possibility for the driver to recognize how strongly he must react, i.e., how large the brake deceleration has to be, which is to be applied by him in order to avert the danger situation. The prior art systems also entail the disadvantage that for the warning always a fixedly predetermined threshold value has to be exceeded which, however, does not take into consideration the surface conditions of the road so that depending on the road conditions, the warning may take place either too early or also too late.

The present invention is concerned with the task to provide an indicating arrangement by means of which an information is given to the driver concerning the magnitude of the brake intensity to be applied and which by reason of a novel evaluating method also gives to the driver a better general view concerning the driving events and concerning his driving behavior.

The present invention essentially consists in that a desired value indication which is formed from the determined values for the brake deceleration necessary for the avoidance of a collision is reproduced on a scale with indicated deceleration values. The possibility is given to the driver by this construction to determine without complicated mental processes whether the brake deceleration necessary for maintaining a distance to an existing obstacle or to a preceding vehicle required in case of a braking operation can be still produced by him or by his vehicle. Thus, it is, for example, possible to provide the scale with certain line markings for values of predetermined deceleration. These markings may also depend, for example, from predetermined deceleration values which the given type of vehicle can maximally produce with a dry road or the like, and the areas or ranges disposed therebetween may be provided with a different coloring so that the driver can or must so select the braking intensity when the desired value indication approaches the limits of these markings, that the desired value again moves away from this danger zone. Advantageously, the scale can thereby even be subdivided into fields of the possible deceleration on different road surfaces in such a manner that a careful driver can already brake slightly when his desired value indication reaches the field for icy or wet roads whereas the actual road surface is dry and gripping.

A particularly advantageous construction is achieved according to the present invention if an existing value indication with the actual deceleration values attained during the braking operation is contrasted to or compared with this desired value indication, which existing value indication is obtained, for example, by differentiation of the driving velocity measured by the vehicle wheels rolling off on the road. It is possible for the driver by means of an indicating arrangement constructed in this manner to apply at any moment the correct braking intensity which he can determine by the fact that the existing value coincides with the desired value. Any deviation between the two values signifies either that too little braking takes place or already too much braking has taken place. Consequently, it will always be indicated to the driver by this comparative indication what he must do or what consequence his reaction has. There even results additionally the possibility to recognize the road condition during the braking by observation of the location of the maximum possible actual value, if different fields of the possible braking deceleration are reproduced on the scale for different road conditions. The driver can be warned in this manner against aqua-planing, frozen (icy) roads, etc. It is also possible for him without difficulty to differentiate with this type of indication in a very simple manner the largest part of genuine warnings from interference pulses or error warnings. Abnormal and jump-like changes of the desired value indication with an unimpaired drive can be recognized immediately as unrealistic whereas, for example, optical or acoustic warning systems would lead only to an unnecessary impairment of the driver. Naturally, it is also possible to construct the scale in such a manner that depending on the road condition, it indicates only the area respectively of interest, for which purpose a shifting operation is necessary which may be carried out, for example, manually.

Since the values for the deceleration are determined from the differentiation of the driving velocity, the disadvantage results for the case of the blocking of the wheels that the differential quotient in this case assumes very high values which are not possible at all physically for the vehicle deceleration. The consequence thereof may be that the values for the follower-distance are indicated incorrectly and that also the values for the actual vehicle deceleration (actual value) are incorrect. In order additionally to avoid these disadvantages, provision may be made that an auxiliary device of conventional construction is coordinated to the measuring and evaluating devices by means of which a fictitious driving deceleration is calculated by evaluation of the approach velocity values, which during the blocking of the wheels replaces the excessive values of the vehicle deceleration determined by differentiation of the actual vehicle velocity measured at the wheels. It can be achieved thereby that during the occurrence of excessively high, physically non-realizable measured vehicle deceleration values, a shifting operation is automatically initiated by the computer, by means of which different deceleration values are inserted into the computing process which are determined by the computer in a different manner and which—as indicated hereinabove—are determined fictitiously.

Accordingly, it is an object of the present invention to provide an indicating arrangement for a distance warning system which avoids by simple means the aforementioned shortcomings and drawbacks encountered in the prior art.

Another object of the present invention resides in an indicating arrangement for a distance warning system which indicates to the driver how strongly he must react in order to avoid an accident.

A further object of the present invention resides in an indicating arrangement for a distance warning installation which also indicates the road surface condition and provides a better overall view for the driver concerning the driving activities and his own reaction.

Still another object of the present invention resides in an indicating arrangement for a distance warning system for use in motor vehicles, which indicates to the driver at all times the brake deceleration necessary to avoid an accident and which further indicates whether such braking deceleration is possible with the given vehicle on the existing road conditions.

Still a further object of the present invention resides in an indicating arrangement for a distance warning system which makes it possible for the driver to apply at every instant the correct brake intensity.

Another object of the present invention resides in an indicating arrangement for a distance warning system which warns the driver also of the road conditions, i.e., against aqua-planing, icy roads, etc.

These and other objects, features and advantages of the present invention will become more apparent from the following description when taken in connection with the accompanying drawing which shows, for purposes of illustration only, two embodiments in accordance with the present invention, and wherein:

FIG. 4 is a block diagram arrangement of the present invention.

Figure 1:
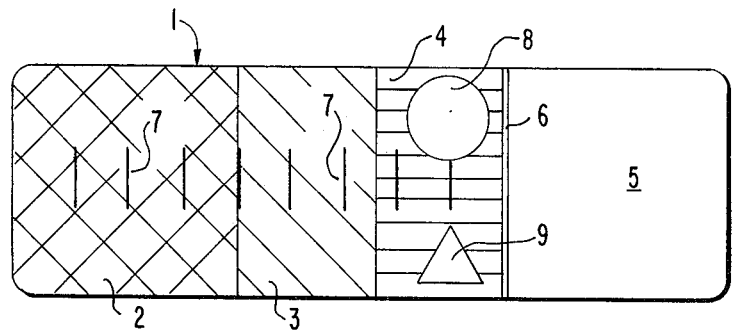
FIG. 1 is a view on the scale of an indicating instrument constructed in accordance with the present invention and which is based on the indication of the deceleration values.

Referring now to the drawing wherein like reference numerals are used throughout the various views to designate like parts, the scale generally designated by reference numeral 1 of an indicating instrument (FIG. 4) is shown in FIG. 1 which is to be so arranged in the viewing direction of the driver that it projects, for example, above the steering wheel rim and lies within the viewing angle of the eyes of the driver, notwithstanding observation of the road. However, it is also possible to project by reflection, for example, by the use of conventional mirror arrangements, the image within the windshield at a suitable place. The scale 1 is subdivided according to this invention into four ranges or areas 2, 3, 4 and 5 which correspond to different deceleration and acceleration values within the scope of the capabilities of the vehicle. The area or range 4 is thereby divided from the area or range 5 by a boundary marking 6 which in the selected embodiment corresponds to a zero acceleration. To the right of this boundary marking 6 is arranged in the illustrated embodiment the acceleration range or area 5 which therefore is to indicate the possibility of acceleration of the vehicle which is the case, for example, with a free, unobstructed road. To the left of the boundary marking 6 are located the areas or ranges which concern the vehicle deceleration and the entire scale field of the areas or ranges 2, 3, and 4 is subdivided by line markings 7 which are entered, for example, at distances indicating each value of 1 m/sec². Thus, the area or range 4 is laid out from the boundary marking 6 approximately up to a deceleration of 2.5 m/sec² and thus represents the permissive deceleration which can be attained on a poor road surface, for example, on ice, snow, slush or the like. A differently colored area or range 3 which adjoins the area or range 4 goes up to about 5 m/sec² and corresponds to deceleration values that can be realized with the vehicle on wet or dirty roads. The area or range 2 forms the end portion, which reaches up to slightly above 8 m/sec² and which corresponds to the deceleration values that can be attained with a dry and gripping road. All areas or ranges can be made of different color.

An indicating value 8 provided in the illustrated embodiment as illuminated circle realized by conventional means moves along the scale, which corresponds to the desired value of the deceleration that suffices for avoiding a collision. This indicating value 8 is determined from the measuring and evaluating devices (FIG. 4) by way of a computer of conventional type and the following relation for the determination of the necessary distance between two vehicles following one another is thereby utilized:

$$A = s_R + t_R \cdot V_{02} + \frac{V_{02}^2}{2a_2 g} - \frac{V_{01}^2}{2a_1 g}$$

with $V_{01} = V_{02} - \Delta V$,
there results: $V_{01}^2 = V_{02}^2 - 2V_{02} \cdot \Delta V + \Delta V^2$,
and thus:

$$A = s_R + t_R \cdot V_{02} + V_{02}^2/2g \left( \frac{1}{a_2} - \frac{1}{a_1} \right) + V_{02} \cdot \frac{\Delta V}{a_1 \cdot g} - \frac{\Delta V^2}{2a_1 \cdot g}$$

whereby:

| | | |
|---|---|---|
| $s_R$ | is the residual distance | (m) |
| $t_R$ | is the reaction time | (sec) |
| $V_{01}$ | is the velocity of the leading vehicle at the considered instant | (m/sec) |
| $V_{02}$ | is the velocity of the trailing vehicle at the considered instant | (m/sec) |
| $a_1$ | is the average braking of the leading vehicle during the braking operation | (—) |
| $a_2$ | is the average braking of the trailing vehicle during the braking operation | (—) |
| and $\Delta V$ | is the difference velocity | (m/sec) |

The difference velocity (the difference in velocity between the two vehicles) and the distance are used in this equation for determining the magnitude of the desired value which both have been determined, for example, by means of conventional radar. The residual distance is to be assumed at will, whereby 2m can be assumed as reasonable magnitude. The magnitudes for the reaction time as well as the values for $a_1$ and $a_2$ are inserted or are assumed on the basis of experience values. On the basis of this relation, it is possible for the computer to calculate by conventional means utilizing known logic elements and circuits the magnitude of the necessary deceleration which would be sufficient in order to prevent a collision with the given conditions. This means that the desired value indication 8 during a normal drive and without an obstacle in front thereof will be located at the right edge of the area or range 5. It is indicated thereby to the driver that nothing stands in the way to an acceleration or to a continuing drive, i.e., which remains the same.

A triangular illuminated point is represented in the illustrated embodiment below the desired value indication 8 which corresponds to the actual value indication 9, i.e., which indicates the deceleration value which is realized by the vehicle at the considered instant. This value is calculated by a differentiation of the vehicle velocity that is determined anyhow by the customary tachometers from the rotary velocity of the wheels. The actual value indication 9 lies therefore on the boundary marking 6 for the aforementioned case of a free road and for a continuing drive which indicates that the vehicle neither experiences an acceleration nor a deceleration.

If the vehicle now approaches an obstacle, then the desired value indicator 8 moves over the area or range 5 toward the left, until the boundary marking line 6 is reached, insofar as the driver has not previously reduced the velocity and increased the distance in that he has released the gas pedal or has braked so that the desired value indicator 8 again has moved toward the right. It becomes already quite clear therefrom that the desired value indication 8 can assume by itself already a certain warning effect, because it indicates to the driver, in which area or range of the deceleration values necessary for avoiding a collision his vehicle finds itself at any given instant. With an indication according to FIG. 1, the driver on a dry road could therefore still somewhat reduce the distance to the preceding vehicle alone by reason of the position of the desired value indication 8 because it is clear to him that he can produce without difficulty the braking decelerations necessary at the indicated instant under the given road conditions.

The actual value indication 9 enables the driver therebeyond to also meter the braking intensity so accurately that it corresponds to the required desired value. If this is the case, as is indicated in FIG. 1, then the desired value indication 8 will again move toward the right over the boundary value marking 6 in which no collision danger exists any longer. The driver, however, with dry roads, as already indicated, can permit the desired value indication 8 to move up to into the area or range 3 if he wants to drive without danger. The actual value indication 9 then indicates to him during the braking operation whether he can attain the required desired value of the deceleration. He reaches this value if the actual value indication 9 is located either below the desired value indication 8 or to the left thereof. He does not reach the same if the triangular actual value indication 9 remains to the right of the desired value.

It is possible to the driver by the described arrangement to adapt his driving behavior individually to the given conditions. A shifting corresponding to the road condition is not necessary, as such. The driver may even determine the condition of the road surface by a braking action, if he observes, to what extent the actual value indication 9 thereby extends to the left into the areas or ranges 2 or 3. It will not go beyond the area 4 with an icy road, and the driver has thus the possibility to determine before driving over a predetermined road section how the road condition is.

Figure 2:
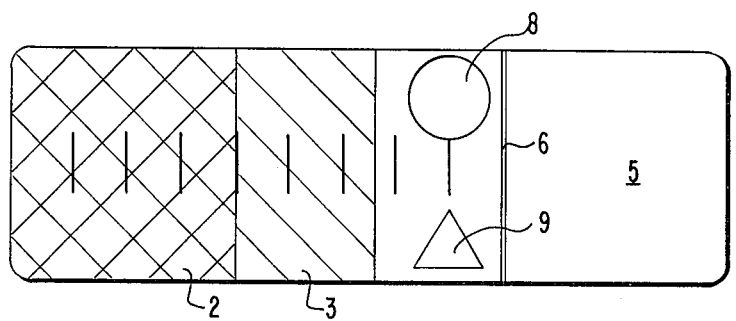
FIG. 2 is a view on the same scale as shown in FIG. 1 in which, however, the indicating installation is provided with a shifting means for taking into consideration the road condition, showing the indicating arrangement in the position for wet roads.
Figure 3:
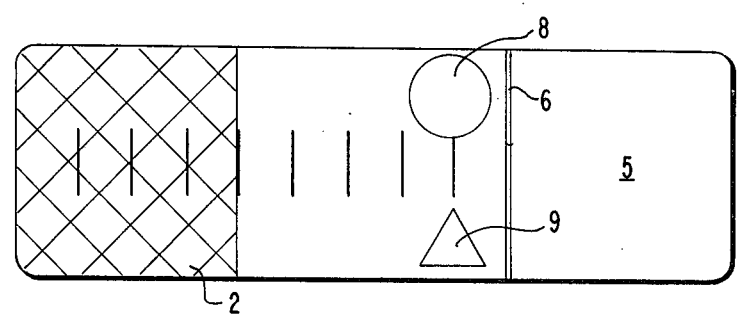
FIG. 3 is a view of the scale of FIG. 2, after shifting over to the conditions with a dry road.

According to FIG. 2, the driver can then shift with a corresponding scale construction by the use of conventional means, for example, to the area or range of a wet road wetted by rain so that the area or range 4 is eliminated as a separate area or range and is now coordinated also to the non-endangered area 5 by appropriate coloring or the like. The same may be realized according to FIG. 3 for dry roads so that also in this case the area or range 3 is eliminated and the non-endangered driving area or range now extends from the area or range 5 to the boundary up to the area or range 2. The individual areas may have different colors in a known manner whereby the area or range 5 is appropriately green and the area or range 2 representing the utmost danger is constructed red. The intermediate areas or ranges may then have different colors, for example, the area or range 3 may be constructed orange and the area or range 4 may be constructed yellow.

Since the distance-measuring and evaluating devices utilizing, for example, radar, infrared or ultrasonics are known as such in the art and since these devices form no part of the present invention, a detailed description thereof is dispensed with herein with FIG. 4 representing a block diagram arrangement of the present invention including the provision of an auxiliary device for calculating a fictitious vehicle deceleration as discussed herein. Similarly, the means used for obtaining the desired and actual signals as well as the means to deflect the light indications 8 and 9 for these desired and actual values are known in the prior art utilizing, for example, a computer with conventional logic circuits and conventional optical systems with appropriate deflection means, and are therefore not described herein for the sake of simplicity since they form, as such, no part of the present invention.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An indicating arrangement with an indicating means for a distance-warning system in motor vehicles that includes a measuring and evaluating means for determining the distance of the vehicle to an obstacle disposed in front thereof and for determining the approach velocity to this obstacle, characterized in that the indicating means includes a scale means having deceleration values marked thereon, means for obtaining a signal from the values determined by the measuring and evaluating means representing the braking deceleration necessary for avoiding a collision and means for reproducing said braking deceleration as desired value indication on the scale means with the deceleration values marked thereon.

2. An indicating arrangement according to claim 1, characterized in that the scale means is subdivided into a range in which acceleration is permitted and into at least one range of deceleration values.

3. An indicating arrangement according to claim 2, characterized in that the range of the deceleration values on the scale means is subdivided into fields of deceleration values possible according to different road surfaces.

4. An indicating arrangement according to claim 3, characterized by further means for producing an actual value indication representing the actual deceleration values achieved during a braking operation and for comparing the actual value indication with the desired value indication.

5. An indicating arrangement according to claim 4, characterized by shifting means for changing the ranges on the scale means depending on the road condition.

6. An indicating arrangement according to claim 5, characterized in that an auxiliary means coordinated to the measuring and evaluating means is operable to calculate a fictitious vehicle deceleration by evaluation of the approach velocity values, and to replace with said fictitious vehicle deceleration during blocking of the wheels, the high values of the vehicle deceleration determined by differentiation of the actual velocity of the vehicle as measured at the wheels.

7. An indicating arrangement according to claim 1, characterized by further means for producing an actual value indication on the scale means representing the actual deceleration values achieved during a braking operation and for comparing the actual value indication with the desired value indication.

8. An indicating arrangement according to claim 7, characterized in that an auxiliary means coordinated to the measuring and evaluating means is operable to calculate a fictitious vehicle deceleration by evaluation of the approach velocity values, and to replace with said fictitious vehicle deceleration during blocking of the wheels, the high values of the vehicle deceleration determined by differentiation of the actual velocity of the vehicle as measured at the wheels.

9. An indicating arrangement according to claim 1, characterized by shifting means for providing ranges on the scale means depending on the road condition.

10. An indicating arrangement according to claim 1, characterized in that the scale means is provided with ranges representative of deceleration values for differing road conditions.

11. An indicating arrangement according to claim 10, characterized by further means for producing an actual value indication on the scale means representing the actual deceleration values achieved during a braking operation and for comparing the actual value indication with the desired value indication.

12. A distance-warning system in motor vehicles which comprises measuring and evaluating means for determining the distance of the vehicle with respect to an obstacle disposed in front thereof and for determining the approach velocity to this obstacle, and an indicating means, characterized by further means for obtaining from the determined values from the measuring and evaluating means a braking deceleration value which is required for avoiding a collision, said indicating means including a scale having deceleration values marked thereon, and said brake deceleration being reproduced on said scale as desired value indication.

13. A system according to claim 12, characterized in that said braking deceleration value is substantially equal to $s_R + t_R \cdot V_{02} + V_{02}^2/2g \cdot (1/a_2 - 1/a_1) + V_{02} \cdot \Delta V/a_1 \cdot g - \Delta V^2/2a_1 \cdot g$, where $s_R$ is the assumed residual distance, $t_R$ is the reaction time, $V_{02}$ the velocity of a following vehicle at the instant under consideration, $a_1$ the average braking of a preceding vehicle during the braking operation, $a_2$ the average braking of the trailing vehicle during the braking operation, and $\Delta V$ the difference in velocity between the two vehicles.

14. An indicating arrangement according to claim 13, characterized by further means for producing an actual value indication representing the actual deceleration values achieved during a braking operation and for comparing the actual value indication with the desired value indication.

* * * * *